US011868477B2

(12) United States Patent
George et al.

(10) Patent No.: US 11,868,477 B2
(45) Date of Patent: *Jan. 9, 2024

(54) SCALE OUT FILE SYSTEM USING REFS AND SCALE OUT VOLUME

(71) Applicant: Microsoft Technology Licensing, LLC, Redmond, WA (US)

(72) Inventors: Mathew George, Redmond, WA (US); Rajsekhar Das, Sammamish, WA (US); Vladimir Petter, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,057

(22) Filed: Jul. 18, 2022

(65) Prior Publication Data
US 2022/0350893 A1 Nov. 3, 2022

Related U.S. Application Data

(63) Continuation of application No. 16/427,707, filed on May 31, 2019, now Pat. No. 11,423,151.

(51) Int. Cl.
*G06F 21/57* (2013.01)
*G06F 9/50* (2006.01)
(Continued)

(52) U.S. Cl.
CPC .......... *G06F 21/575* (2013.01); *G06F 9/4405* (2013.01); *G06F 9/5016* (2013.01); *G06F 9/5061* (2013.01); *G06F 21/6281* (2013.01)

(58) Field of Classification Search
CPC .... G06F 21/575; G06F 9/4405; G06F 9/5016; G06F 9/5061; G06F 21/6281;
(Continued)

(56) References Cited

U.S. PATENT DOCUMENTS 8,818,951 B1 8/2014 Muntz et al.
8,984,221 B2 3/2015 Satoyama et al.
(Continued)

OTHER PUBLICATIONS

"Notice of Allowance Issued in U.S. Appl. No. 17/556,970", dated Feb. 21, 2023, 9 Pages.
(Continued)

*Primary Examiner* — Quazi Farooqui

(57) ABSTRACT

Some storage systems are configured with VDL (valid data length) type controls that are implemented on a per cluster basis and, in some instances, on a sub-cluster basis, rather than simply a per file basis. In some instances, per-cluster VDL metadata for the storage clusters is stored and referenced at the edge data volume nodes of a distributed network for the storage system rather than, and/or without, storing or synchronizing the per-cluster VDL metadata at a master node that manages the corresponding storage clusters for the different data volume nodes. Sequence controls are also provided and managed by the master node and synchronized with the edge data volume nodes to further control access to data contained in the storage clusters.

20 Claims, 9 Drawing Sheets

(51) Int. Cl.
*G06F 9/4401* (2018.01)
*G06F 21/62* (2013.01)

(58) Field of Classification Search
CPC .... G06F 3/0622; G06F 3/0631; G06F 3/0637; G06F 3/0643; G06F 3/0665; G06F 21/6218; G06F 21/78; G06F 3/067; G06F 21/57; G06F 9/50; G06F 9/4401; G06F 21/62

See application file for complete search history.

(56) References Cited

U.S. PATENT DOCUMENTS

| | | | |
|---|---|---|---|
| 9,383,924 B1* | 7/2016 | Fullbright | G06F 3/067 |
| 10,084,873 B2 | 9/2018 | Dornemann | |
| 10,353,790 B1 | 7/2019 | Rangaiah et al. | |
| 2009/0106255 A1 | 4/2009 | Lacapra et al. | |
| 2010/0070726 A1 | 3/2010 | Ngo et al. | |
| 2011/0161299 A1 | 6/2011 | Prahlad et al. | |
| 2012/0084523 A1 | 4/2012 | Littlefield et al. | |
| 2013/0268493 A1 | 10/2013 | Berman et al. | |
| 2013/0282662 A1 | 10/2013 | Kumarasamy et al. | |
| 2015/0212893 A1 | 7/2015 | Pawar et al. | |
| 2016/0371153 A1 | 12/2016 | Dornemann | |
| 2019/0220528 A1 | 7/2019 | Cruciani et al. | |
| 2020/0026438 A1 | 1/2020 | Peleg et al. | |
| 2020/0125460 A1* | 4/2020 | Selvaraj | G06F 3/0614 |

OTHER PUBLICATIONS

"Office Action Issued in European Patent Application No. 20730156.5", dated Mar. 1, 2023, 9 Pages.

"Non Final Office Action Issued in U.S. Appl. No. 17/556,970", dated Sep. 29, 2022, 14 Pages.

"Office Action Issued in European Patent Application No. 20718437.5", dated Oct. 26, 2023, 12 Pages.

* cited by examiner

SCALE OUT FILE SYSTEM USING REFS AND SCALE OUT VOLUME

CROSS-REFERENCE TO RELATED APPLICATIONS

This application is a continuation of U.S. patent application Ser. No. 16/427,707, filed on May 31, 2019, entitled "Scale Out File System Using Refs and Scale Out Volume," which is incorporated here in by reference in its entirety. To the extent appropriate, a claim of priority is made the above-described application.

BACKGROUND

The management of storage clusters by some storage systems can result in undesired vulnerabilities to the data stored therein, such as lingering exposure to deleted data. This can include the unwanted and unexpected exposure to very sensitive data, such as passwords and other critical information.

By way of example, the deletion of data from a first file may trigger the deallocation of a storage cluster assigned to store that portion of data for the first file. However, if that storage cluster is later reallocated to a second file, without initializing the bits associated with that cluster, the deleted data from the first file will remain accessible within the reallocated cluster unless and until it is overwritten by data for the second file. This data may include very sensitive data that was intentionally deleted from the first file, but which is still accessible to any program that could potentially make a read to the storage cluster as part of the second file, until that data is overwritten.

By way of another example, in a multi-tenant scenario, a virtual machine for a first tenant may be decommissioned, once it is no longer needed. This may result in the reallocation of storage clusters of a VMDK (Virtual Machine Disk), for instance, of the virtual machine of the first tenant to a pool of available storage clusters to be subsequently reallocated to a new tenant. In such a scenario, the new tenant could potentially access data of the first tenant, either intentionally or unintentionally, by making a read to the storage clusters that were part of the first tenant's VMDK and that are now reallocated as a part of the new tenant's VMDK.

The foregoing problems can be avoided, in some instances, by initializing or overwriting all of the bits of the storage clusters whenever they are deallocated and/or reallocated. However, comprehensive initialization of storage can be computationally expensive and can impact the overall responsiveness and other performance of a storage system. In this regard, it may be undesirable, particularly when considering that there may be alternative and less expensive solutions for restricting access to data contained within reclaimed/reallocated storage clusters.

Alternative controls for restricting access to stored data, which do not require immediate and comprehensive initialization of storage clusters during deallocation/reallocation processing, include VDL (valid data length) controls. VDLs are well-known and are used in many filesystems, such as exFAT (Extended File Allocation Table), NTFS (New Technology File System), and ReFS (Resilient File System).

Existing VDLs are typically implemented on a per-file basis. They are used to identify the high watermark or extent of the allocated storage for which each corresponding file has been written to. This enables a file's VDL to be used to help prevent reads to the file's allocated storage cluster(s) that extend beyond the identified VDL and which have not yet been written to for that file.

For instance, when a request is received for a file's storage beyond the file's VDL, the VDL controls can be used to trigger a synthetic response, such as all zeros, rather than the actual data that may be stored beyond the VDL. Accordingly, VDL controls can be used to effectively hide residual data that may actually exist in a file's storage without having to initialize or overwrite that data when the corresponding storage is reallocated to a new file.

While VDLs have proven useful for controlling accessing to a file's allocated storage, it will be noted that the management of existing per-file VDLs from a single centralized node, which includes tracking and updating of the VDLs, can be unwieldy and can still impose an undesired burden on network bandwidth, particularly as client requests must be processed through the centralized VDL management node.

In some instances, a storage system may be configured to store the per-file VDLs at the distributed edge nodes that contain the stored data, as well as at a centralized management node. This can enable clients to interface directly with the edge nodes, without having to interface directly through the centralized VDL management node for all requests. While these configurations can help reduce some network traffic, as compared to the alternative solutions, these configurations still require more network traffic than would be desired. Some of this undesired traffic includes the communications required to update and validate the truth of the VDLs at each of the different edge nodes prior to the edge node(s) responding to the client requests.

The foregoing is particularly true for situations in which a file is shared between several storage clusters at different edge nodes, as well as situations in which storage clusters are reallocated between different tenants. In these situations, each write request/reallocation has the potential to change the VDL for a particular file and may require the VDL to be updated at a plurality of different edge nodes. Accordingly, in order to facilitate the utility of the VDL data access controls, the edge nodes need to frequently interface with the centralized VDL management node to verify the truth of the VDLs they manage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein include storage systems, computer program products and methods for managing storage systems with VDL (valid data length) controls that are implemented on a per cluster basis and, in some instances, on a sub-cluster basis, rather than simply a per file basis. In some instances, per-cluster VDL metadata for the storage clusters is stored and referenced at the edge data volume nodes of a distributed network rather than, and/or without, storing or synchronizing the per-cluster VDL metadata at a master node that manages the corresponding storage clusters for the different data volume nodes. Sequence controls are also provided and synchronized by the master node with the appropriate edge data volume nodes to further control access to data contained within the corresponding storage clusters.

Some embodiments include methods, systems, and computer program products for implementing the management of distributed storage systems based on processes performed at data volume nodes of the distributed storage system. For instance, these embodiments include a data volume node having a data volume with storage clusters that are managed by a master metadata node that allocates one or more of the storage clusters of the data volume node to one or more files. The data volume node is also configured with at least one processor and executable instructions that are executable by the at least one processor to cause the data volume node to execute a data volume node method for implementing data access controls on a per cluster basis for the plurality of storage clusters.

The data volume node method includes an act of the data volume node receiving, from the master metadata volume node, an assignment of one or more storage clusters along with one or more corresponding sequence numbers associated with the one or more storage clusters, which are contained within the data volume of the data volume node. The data volume node method also includes an act of the data volume node locally associating the corresponding sequence number with by the data volume node and locally setting a VDL (valid data length) indicator for a storage cluster of the one or more storage clusters to an initialized state that indicates the storage cluster has not stored data for which the storage cluster is allocated (even if it does have data from a previous file allocation).

This method also includes an act of the data volume node receiving a client write request for the at least one storage cluster. Notably, the request is permitted only upon the data volume node receiving the corresponding sequence number from the client that is associated with the write request and while the corresponding sequence number is still associated with the storage cluster by the data volume node. Thereafter, upon permitting the client write request, and upon data being written to the storage cluster, the data volume node updates the VDL indicator for the storage cluster at the data volume node to indicate the storage cluster has stored data and without requiring synchronization of the VDL indicator for the storage cluster at the master metadata volume node.

Other embodiments include methods, systems, and computer program products implementing the management of distributed storage systems based on processes performed at a master volume node of the distributed storage system. For instance, these embodiments include a master volume node configured with at least one processor and executable instructions that are executable by the at least one processor to cause the master volume node to execute a master node method for implementing data access controls on a per cluster basis for the plurality of storage clusters contained in data volumes of one or more data volume nodes in a distributed storage system and for managing allocation of the data clusters to one or more files stored within the distributed storage system.

The master node method includes the master metadata volume allocating different storage clusters contained in one or more data volumes of one or more different data volume nodes to a first file by dividing the file between the different storage clusters, as well as, generating and assigning a sequence number to each corresponding storage cluster. In some instances, a different sequence number is assigned to each correspondingly different storage cluster. In other instances, a single sequence number is assigned to a group of storage clusters and, in some instances, a single sequence number is assigned to all storage clusters belonging to a single file or other data structure. This method also includes the master metadata volume providing the assigned sequence numbers for the different storage clusters to the one or more different data volume nodes containing the different storage clusters, respectively. Notably, the sequence number for any particular storage cluster is also changed by the master metadata volume prior to the corresponding storage cluster being reallocated to a different file.

This method also includes the master metadata volume receiving a file access request from a remote client for the first file and responsively, providing the remote client an identification of one or more different storage clusters allocated to the first file, and which correspond with the file access request, along with one or more sequence numbers that are associated with the one or more different storage clusters.

In some instances, the master metadata volume also refrains from locally storing and/or synchronizing VDL (valid data length) indicators for the different storage clusters which are used and stored locally at the different data volume nodes to indicate whether the one or more different storage clusters have stored data.

Other embodiments include methods, systems, and computer program products for client computing systems to interface with a distributed storage system that utilizes unique sequencing and per-cluster VDL access controls. For instance, these embodiments include a client system configured with at least one processor and executable instructions that are executable by the at least one processor to cause the client system to execute a client system method in which the client system provides a file access request to a master metadata volume node for access to a file for which the master metadata volume node allocates and manages storage clusters for the file.

This method also includes the client system receiving an identification of one or more different storage clusters allocated to the file by the master metadata volume node, which was provided by the master metadata volume in response to the file access request, and which corresponds with the file access request, along with one or more sequence numbers that are associated with the one or more different storage clusters.

The client system method also includes the client system sending a data access request, comprising a read or write request, to a particular data volume node containing the one or more different storage clusters along with the one or more sequence numbers that are associated with the one or more different storage clusters, each of the one or more different storage clusters being associated with a corresponding sequence number.

Thereafter, in response to the data access request, the client system receives either an indication of the data access request is granted or denied by the particular data volume node. In some embodiments, the data access request is granted in response to the one or more sequence numbers being associated with the one or more different storage clusters at the data volume node and in response to a VDL (valid data length) indicator indicating data is written to the one or more storage clusters for the file. Notably, this VDL indicator is stored at the particular data volume node without being stored by or synchronized with the master metadata volume node.

In some instances, the data access request is denied when the one or more different sequence numbers provided by the client system fail to be associated with the one or more different storage clusters at the particular data volume node at the time of the request and/or in response to the VDL indictor indicating that data is not written to the one or more storage clusters for the file.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims and/or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates an illustration of how VDL indicator can be used to identify storage clusters that have been written to by a file the storage clusters are allocated to;

DETAILED DESCRIPTION

Disclosed embodiments include storage systems, computer program products and methods for managing storage systems with VDL (valid data length) controls that are implemented on a per cluster basis and, in some instances, on a sub-cluster basis, rather than simply a per file basis. In some instances, per-cluster VDL metadata for the storage clusters is stored and referenced at the edge data volume nodes of a distributed network rather than, and/or without, storing or synchronizing the per-cluster VDL metadata at a master node that manages the corresponding storage clusters for the different data volume nodes. Sequence controls are also provided and synchronized by the master node with the appropriate edge data volume nodes to further control access to data contained within the corresponding storage clusters.

Figure 1:
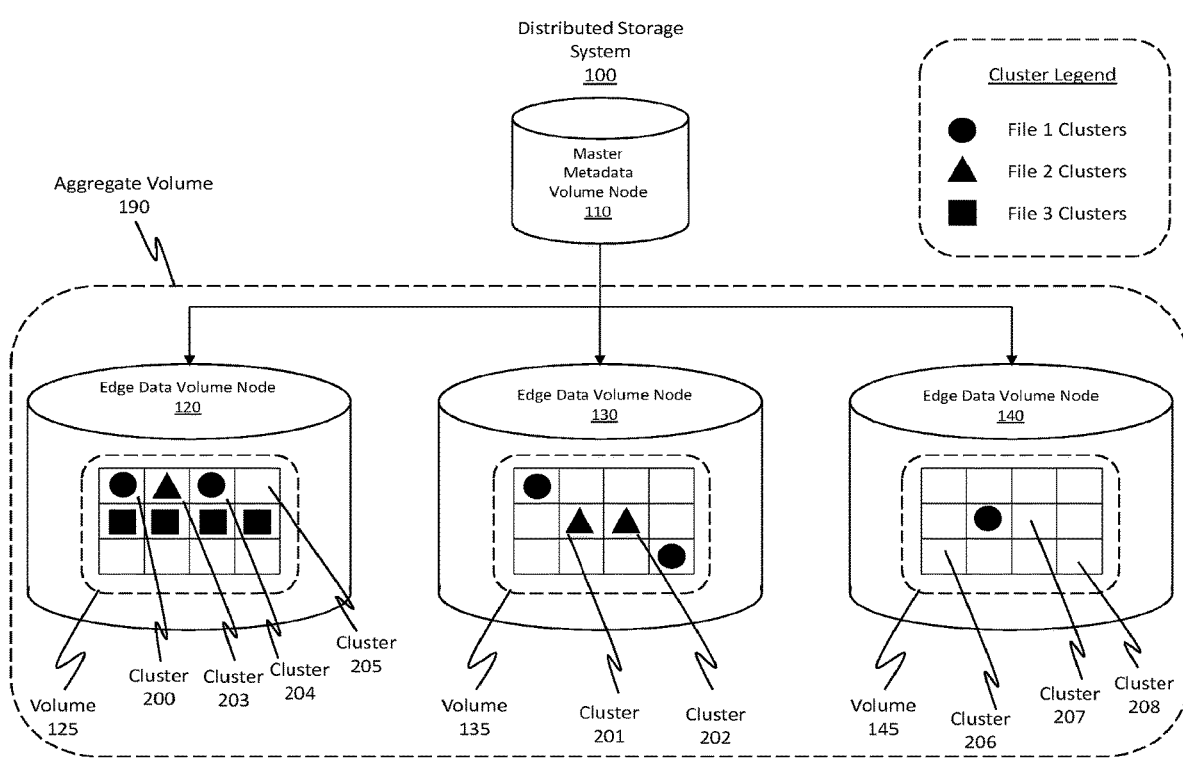
FIG. 1 illustrates an example of a distributed storage system, which includes a master node that manages and allocates storage clusters that store data for files in different remote edge data volume nodes.

Referring now to FIG. 1 a distributed storage system 100 is shown, which includes a master metadata volume node 110 in communication with one or more edge data volume nodes (e.g., 120, 130 and 140), which each contains a corresponding data volume (e.g., 125, 135 and 145, respectively), with each data volume comprising one or more storage clusters that are selectively allocated by the master metadata volume node 110 to one or more files stored in the distributed storage system 100. While the master metadata volume node 110 is shown as being remote from the one or more edge data volume nodes (120, 130 and 140), it will be appreciated that this relationship be a logical boundary relationship rather than an actual physical relationship associated with remoteness. In fact, the mater metadata volume node 110 can, in some instance, include or be positioned within a same physical machine/system, in which case they are simply logically remote (e.g., positioned on different logical partitions, domains and/or instances of a same machine/system). In other instances, the master metadata volume node 110 is physically positioned remotely from the one or more edge data volume nodes (e.g., positioned in a different room, building, city, state, country, etc. from the edge data volume node(s).

In view of the foregoing, it will be appreciated that when reference is made to the master metadata volume node remotely and centrally managing the files of the data volume nodes, this can include embodiments in which the remote/central management is a logical relationship and/or a physical relationship and may, for instance, include situations in which the remotely managed files are hosted by the same machine that is hosting the master metadata volume node.

Currently, each data volume edge node is shown to have an equally sized data volume and each volume is shown to have a plurality of storage clusters. It will be appreciated that the scope of the invention is not limited to a quantity of data volumes (e.g., 1 or a plurality of data volumes) or data volume sizes (e.g., KB (kilobytes) to TB (terabytes) or even larger), that are formatted on the data volume nodes, nor a quantity of storage clusters per data volume (e.g., 1 or a plurality of clusters), nor a quantity of data volume nodes (e.g., 1 or a plurality of data volume nodes), nor a quantity or type of files stored in the distributed storage system.

Furthermore, it will be appreciated that the master metadata volume node 110 can also comprise a data volume that contains storage clusters for storing all or a part of one or more files of the distributed storage system, just like one of the data volume nodes and when it does, it may operate as both the master metadata volume node and, separately but concurrently, as one or more data volume nodes. Each of the data volumes may be implemented as the disk of a corresponding data volume node and/or as a virtual storage resource, such as a virtual disk for a virtual machine (such as a virtualized data volume node).

In some instances, files managed by the distributed storage system are divided between different data volume nodes, with different clusters of one or more different data volume nodes storing different portions of the files. In some instances, files (or portions of the stored files) are additionally, and/or alternatively, distributed among non-contiguous storage clusters of a single data volume node.

In the present illustration, file 1 is presently written to five different storage clusters that are distributed among three different data volume nodes (120, 130 and 140). Likewise, file 2 is presently written to three different storage clusters that are distributed among two different data volume nodes (120 and 130) and file 3 is presently written to four contiguous storage clusters of a single data volume node (120).

Each of the storage clusters (also referred to as a block, herein) is a single contiguous and addressable chunk of storage bits within a single data volume node. In some embodiments, the data volume for each data volume node comprises a plurality of clusters of an equal allocation unit size, such as determined by the master metadata volume node when the data volumes of the data volume nodes are initially formatted. It will be appreciated that the disclosed embodiments are not limited, however, to any particular size or quantity of storage clusters used by the distributed storage system 100. (e.g., clusters as small as a few Kbytes or even smaller, to clusters that are as large as several megabytes or even larger). The quantity of clusters is then dependent upon the overall data volume allocation. In an extreme example, a data volume could potentially consist of only a single cluster or up to many thousands of clusters.

Collectively the data volumes (125, 135, 145 and/or other data volumes not shown), form an aggregate volume 190 that is managed by the master metadata volume node 110. In some existing systems, the master metadata volume node is configured to allocate different storage clusters to different files/applications. Sometimes, data is written to a storage cluster and then that storage cluster is reallocated for other use, but prior to initializing the storage cluster, such that the data could potentially be accessed by a different and new application/file, as described in the Background (above). This is particularly true in distributed storage systems.

To help control and prevent unauthorized access to the data that remains within a storage cluster at the time the storage cluster is reallocated, some existing systems (e.g., ReFS) utilize VDLs to prevent access to the storage clusters allocated to a particular file if the VDLs indicate that the requested storage clusters have not stored data written by the currently allocated file. Unfortunately, as also described above, the communications required to synchronize the VDLs with the master metadata volume node can impose a heavy burden on the network bandwidth of a distributed storage system.

The current embodiments can be used to help ameliorate the communication burden by utilizing VDL indicators that are maintained at the data volume node, and without storing or synchronizing the VDL indicator data at the master metadata volume node that manages the allocation of the storage clusters. To facilitate the utility of the VDL indicators described herein, the disclosed embodiments also utilize sequence controls that are centrally managed and synchronized by the master metadata volume node with the various data volume nodes in the distributed network. These sequence controls do not require as much updating and synchronization as the VDLs of prior systems and can be used, therefore, to reduce the overall network communications when compared to the prior systems that relied upon centralized/synchronized VDLs.

Figure 2:
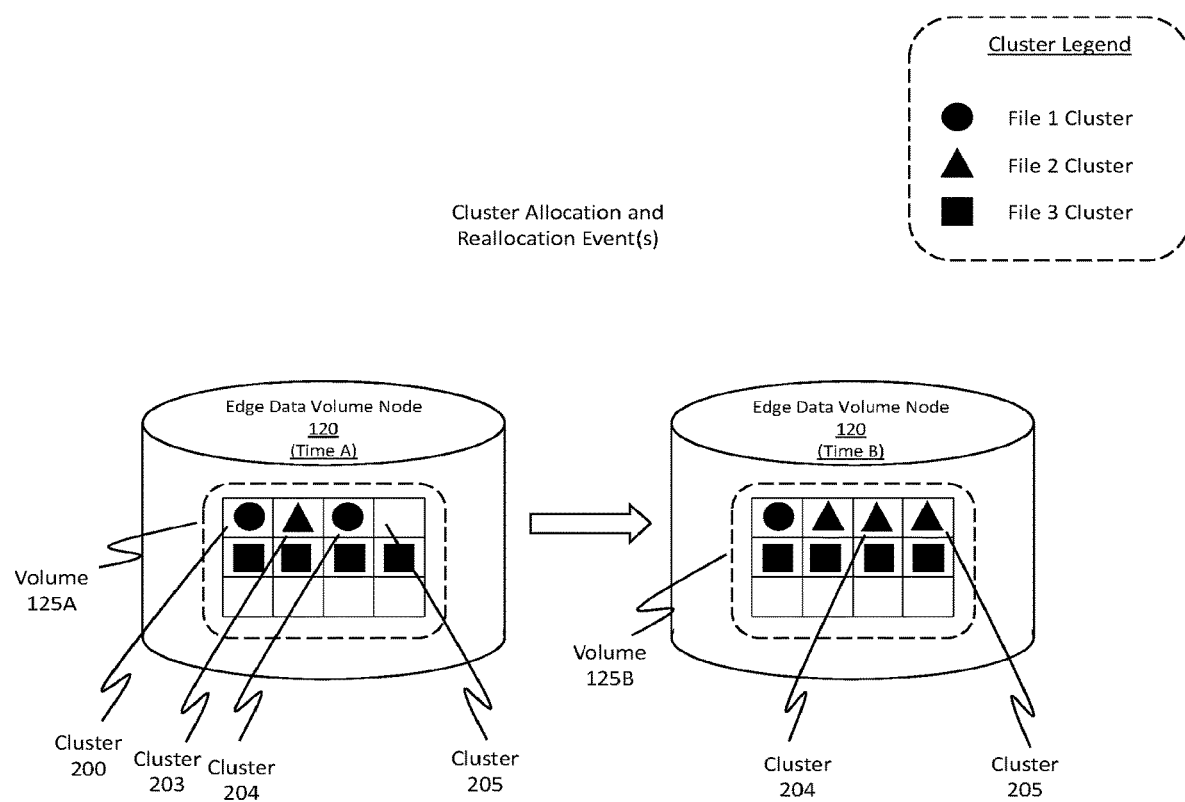
FIG. 2 illustrates an example of a volume of storage clusters in an edge data volume node, with one cluster being allocated to a file a second cluster being reallocated to that file.

FIG. 2 illustrates an example of a data volume of storage clusters of the data volume node 120 that was previously shown and described in reference to FIG. 1. As presently shown, the data volume of data volume node 120 is illustrated as both volume 125A, at time A, and as volume 125B, at a subsequent time B).

At time A, the data volume 125A is illustrated with two clusters (200 and 204) allocated to file 1, one cluster (203) allocated to file 2 and four clusters allocated to File 3, as reflected by the Cluster Legend. It will be appreciated, however, that other clusters in the data volume 125A, which are presently illustrated as being empty, such as cluster 205, may also be allocated to one of the files (e.g., file 1, 2, 3 or another file), but which are currently not containing data when illustrated as being empty.

At time B, the data volume 125B has changed insofar as data filled cluster 204 has been deallocated from file 1. This example also shows that cluster 204 has been reallocated to file 2, and data empty cluster 205 has also been newly allocated to file 2.

The master volume node 110, not presently shown, may perform the deallocation, reallocation and allocation processes described above, for any number of reasons, such as, for example, in response to detecting the deletion of file 1 (putting the clusters of file 1 in a pool of available clusters to be allocated) and a request to allocate space for a new file (in which case the clusters are pulled from the pool of available clusters and allocated to the new file). The master volume node tracks which storage clusters are allocated to each of the different files, as well as the addresses of the different clusters within the different data volumes of the various data volume nodes.

In such an example as this, the data of cluster 204 (which could comprise very sensitive data of file 1) could potentially be accessed after cluster 204 is reallocated to file 2 (such as triggered, for example, by the. After cluster 204 is reallocated and until cluster 204 is initialized (e.g., zeroed out) and/or overwritten with new data for file 2, that lingering data from cluster 204 (which was written to cluster 204 at time A) will remain accessible.

To help prevent access to the data of a deallocated/reallocated storage cluster, the master volume node may use VDL data, as previously described. However, rather than maintaining and synchronizing a per-file or even a per-cluster VDL with the master node, the disclosed embodiments use VDL indicators at the data volume nodes with centralized/synchronized sequence information to control access to the data of deallocated and reallocated storage clusters.

Figure 3:
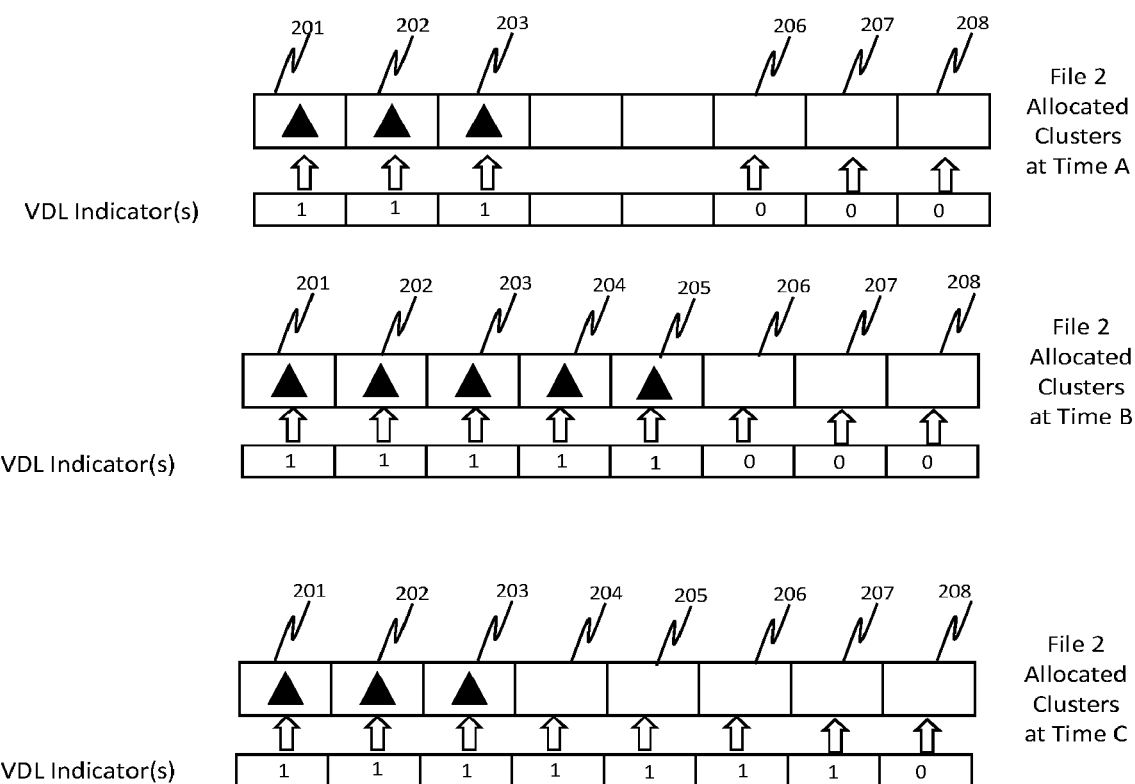

FIG. 3 illustrates an illustration of how per-cluster VDL indicators can be used to identify storage clusters that have been written to by a file that the corresponding storage clusters are currently allocated to, whether that written data remains with the file or not.

In the current example, clusters 201-203 and 206-208 are shown as being allocated to file 2 at time A, while clusters 201-208 are all allocated/reallocated to file 2 at both of time B and time C. It is noted that clusters 201 and 202 are contained in data volume 135 of data volume node 130, while clusters 202-205 are contained in the data volume 125 of data volume 120 and clusters 206-208 are contained in data volume 145 of data volume node 140, see FIG. 1. This example is presented to show how a file can be allocated storage clusters that are distributed among different data volumes and/or even fragmented within the same data volume of a storage system.

As also shown, clusters 204 and 205 were not allocated to file 2 at time A. Instead, cluster 204 was allocated to file 1, and contained data from file 1, at time A (as described above). Likewise, cluster 205 was either unallocated at time A, or was allocated to a different file than file 2 at time A, without containing any data from the different file it may have been allocated to at time A (as also described above).

The VDL indicators are used according to the present embodiments to help enforce controlled access to the data of the different storage clusters, based on whether the data in the storage clusters was written to the storage clusters by the files they are currently allocated to. For instance, in the current implementation, the VDL indicator is a single bit that, when set to 1, indicates that the corresponding storage cluster has had data written to it by the file that is currently allocated to. Alternatively, if/when the VDL indicator is set to zero, it indicates that the corresponding storage cluster has not had data written to it by the file it is currently allocated to.

This is more clearly shown with regard to the examples of FIGS. 1 and 2. For instance, at time A, file 2 currently as data written to clusters 201, 202 and 203, but not clusters 204-208 (see FIGS. 1 and 2). This is clearly reflected by the VDL indicator bit being set to a value of 1 for clusters 201-203, but not for in 204-208. Instead, the VDL indicators for clusters 204-208 are set to (or remain at) an initialized state of zero, which indicates that the currently assigned file (file 2) has not yet written data to those corresponding storage clusters, as of time A.

At time B, however, clusters 204 and 205 have now been reallocated/allocated to file 2 (see FIG. 2), and they also contain data from file 2. This is reflected by the VDL indicators for clusters 204 and 205 being changed/set to a value of 1. Notably, however, prior to overwriting cluster 204 with data from file 2, it contained data from file 1. At that time (prior to being overwritten with new data from file 2), cluster 204 had a VDL indicator set to an initialized state of zero (not presently shown). But, it was changed to the value of 1 when file 2 wrote data to cluster 204, as reflected at time B. The remaining data clusters 206, 207 and 208 have VDL indicators set to zero at time B, indicating that they do not have any data written to them from file 2, to which they are currently allocated at time B.

At time C, the VDL indicators for clusters 204-207 are all set to 1, but no data is presently illustrated as being stored in clusters 204-207. This is because, subsequent to time B, data from file 2 has been written to clusters 206 and 207 and then the data of file 2 in clusters 204-207 has been deleted. The VDL indicators indicate that data from file 2 has been written to clusters 201-207, for the file they are currently assigned to. That way, file 2 can make a read to clusters 204-207 without being exposed to data from another file that may have previously been written to those clusters before being allocated/reallocated to file 2, such as the data of file 1, which use to be written to cluster 204. Cluster 208 has not yet been written to by file 2, however, so the VDL indicator remains set at zero, to prevent a read to that cluster. When a read is received, the system can provide an error or a synthetic response, such as all zeros for each cluster, or sub-cluster (see below) that is currently set to the initialized state of zero.

While the foregoing description has referenced how the VDL indicator may be a per-cluster indicator comprising a binary bit value. It will be appreciated that other types of VDL indicators may also be used to track the VDL of a particular cluster more granularly.

By way of example, some embodiments include the use of a multi-bit sub-cluster watermark VDL indicator which indicates a watermark extent (or chunks) of a particular storage cluster that have been written to by a file during the current file allocation to that file.

A multi-bit watermark may apply a different bit for each sub-cluster/chunk of a cluster (with the number of bits and sub-clusters corresponding to the desired sub-cluster granularity). For instance, if the cluster size is 64 Kbytes and a user desires to subdivide the cluster into four 16 Kbyte chunks, the multi-bit watermark could use a total of four bits to give greater granularity about the portions of the cluster that have been written to by the associated file. (e.g., one bit for the first chunk, a second bit for the second chunk, a third bit for the third chunk and a fourth bit for the fourth chunk, similar to how the single bit indicator is used for the whole cluster).

Another multi-bit watermark indicator can include the mapping of different combination bit values to correspond different magnitudes for which the cluster has been written (e.g., when a cluster is subdivided into 512 byte chunks, a two bit indicator set to 00 could indicate no data has been written to the cluster, whereas the indicator set to 01 could indicate that data has been written by the file to the first 512 byte chunk, and the indicator set to 10 could indicate that the first 1024 byte chunk has been written to by the file, and the indicator set to 11 could indicate that the first 1536 byte chunk has been written to).

In another embodiment, by way of example, discrete bit values can be assigned to different chunks of the cluster. This mapping may employ different quantities of bits depending on the size of the cluster and the quantity of sub-cluster mappings desired (e.g., for a 64 Kbyte cluster having six (6) different chunk mappings of different sizes, the binary value of 0 could indicate nothing has been written by the file to the cluster, a binary value of 1 could indicate the first 512 byte chunk of the cluster has been written to, a value of 2 could indicate the first 1024 byte chunk of the cluster has been written to, a binary value of 3 could indicate the first 4 Kbyte chunk of the cluster has been written to, a binary value of 4 could indicate the first 8 Kbyte chunk of the cluster has been written to, a binary value of 5 could indicate the first 16 Kbyte chunk of the cluster has been written to, a binary value of 6 could indicate the first 32 Kbyte chunk of the cluster has been written to, a binary value of 7 could indicate the entire 64 Kbyte chunk of the cluster has been written to.

When a read is directed a cluster having more granular water mark VDL data, the system can provide the data for the chunks of the cluster that have the corresponding watermark VDL set and provide all zeros for the rest of the cluster (which do not have the VDL set—indicating that they are set by default to an initialized state to reflect that they do not have data written by the file for the current file allocation).

The different VDL indicator mappings and configurations can be used to accommodate different needs and preferences and can accommodate different desires to balance updating of a watermark. For instance, more granular watermarks could be used by certain types of media (e.g., flash) for allowing updates to the VDL without having to erase/reset a prior VDL value until resequencing is performed with the corresponding storage cluster.

Figure 4A:
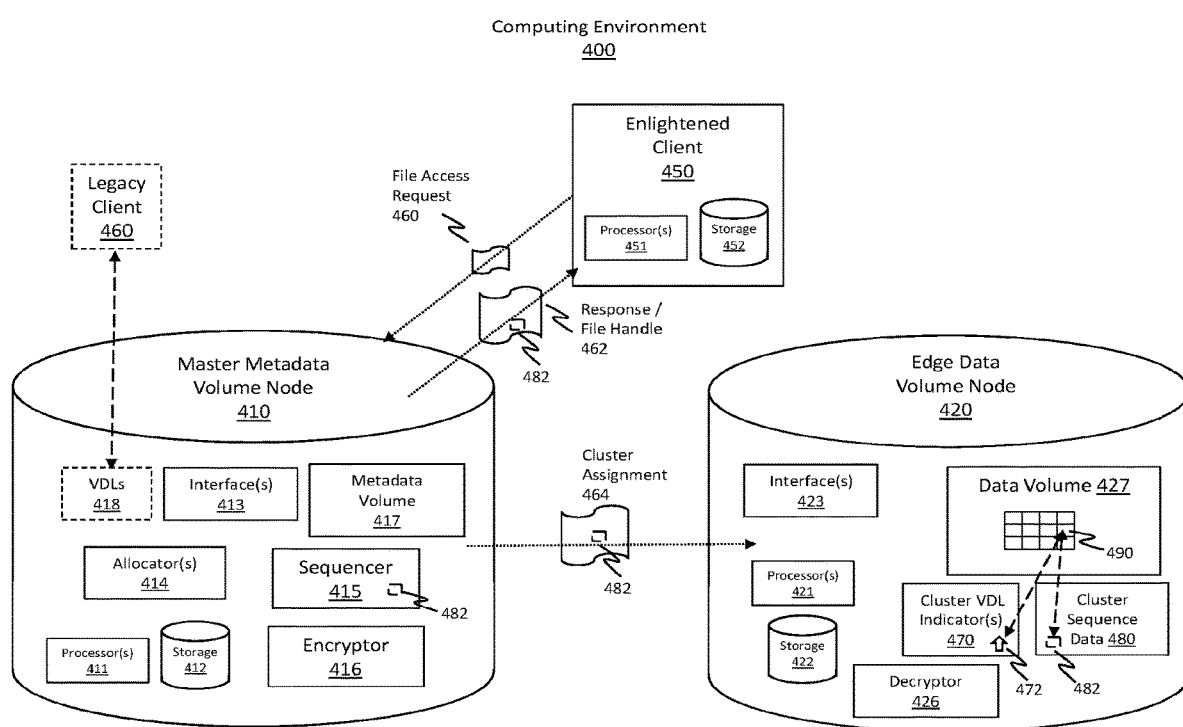
FIGS. 4A-4C illustrate embodiments of a computing environment in which a distributed storage system that includes a data volume node that stores data that can be accessed by a client system and that was allocated by a master metadata volume node in accordance to the methods described in reference to FIGS. 5-7.
Figure 4B:
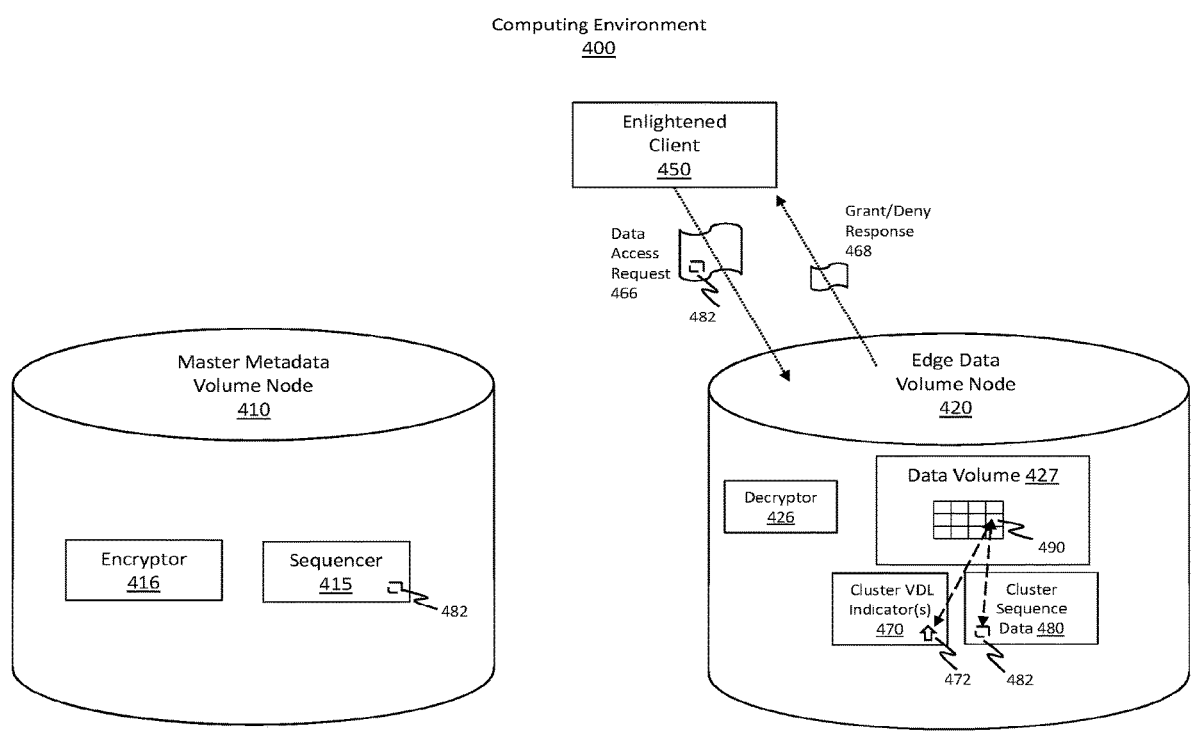
Figure 4C:
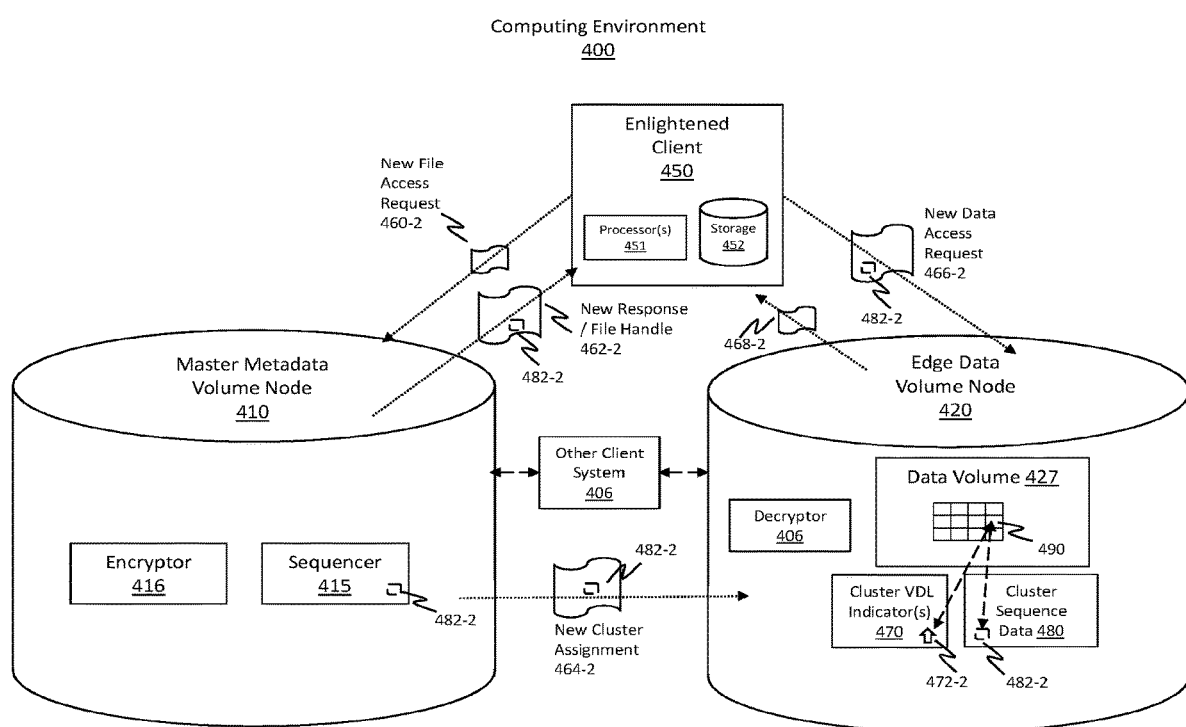

FIGS. 4A-4C will now be referenced to further describe embodiments for using the VDL indicators at edge data volume nodes (without storing or synchronizing the VDL indicators at the master volume node) to help restrict access to data from storage clusters that are reallocated by the master volume node.

FIGS. 4A-4C illustrate a computing environment for a distributed storage system, like distributed storage system 100, in which a master metadata volume node 410 allocates one or more storage clusters to one or more files that are distributed among the data volume(s) 540 of one or more data volume nodes 420. FIGS. 4A-4C also correspond with the methods described in reference to FIGS. 5-7.

As shown, the master metadata volume node 410 (also referred to herein as a master node and a master volume node) contains one or more processor(s) 411 and storage 412 having stored computer-executable instructions that are executable by the one or more processor(s) 411 to implement the functionality of the master node 410 that is described herein.

The storage 412 may also include the interfaces 413 that are used to communicate with the various client systems and edge data volume nodes described herein and to facilitate communications between the different master node components, including the allocator(s) 414, the sequencer 415, the encryptor 416 and the metadata volume 417.

The allocator(s) 414 are configured to allocate storage clusters of the storage system to different files. When the allocator(s) 414 include a plurality of different allocators 414, they are each assigned to a different domain/zone of the storage system. They may each be associated with different permissions, tenants, clients, and or different physical resources that each allocator is assigned management over. The allocator(s) 414 are also configured track the addresses and assignments of each storage cluster.

The sequencer 415 is configured to generate and assign a sequence number to a storage cluster when it is allocated to a particular file. The sequence numbers are tracked by the sequencer and/or allocator(s) 414 within data structures stored in storage 412. In some instances, the sequence numbers are generated by random number generators. In other instances, the sequence numbers are incrementing values that are incremented each time a storage cluster having a previous sequence number is reallocated.

Encryptor 416 is configured to optionally encrypt the sequence numbers before they are transmitted to client systems that are requesting the handle to the files they are requesting. This type of encryption can be used to prevent snooping and guessing of incrementing sequence numbers by malware and bad actors. The encryptor 416 uses a combination of one or more encryption keys, hashes and/or authentication information to encrypt the sequence numbers. Corresponding decryption keys and authentication information is provided to the data volume nodes to use in decrypting the encrypted security keys. In some instances, the encryptor encrypts the sequence number(s) with a hash signed by an encryption key for which the data volume node has a corresponding decryption key. Any desired encryption techniques can be used, including symmetric and asymmetric encryption.

The metadata volume 417, which may be a part of storage 412, stores various data that is used to help manage the distributed storage system, including the authentication information and the cluster addresses and assigned sequence numbers.

In most embodiments, the metadata volume node 410 refrains from storing or tracking any VDL information for the different storage clusters, with all of the VDL indicator data being maintained only at the data volume nodes containing the corresponding storage clusters.

In one alternative embodiment, however, the metadata volume 417 stores VDL data 408, which is used provided to legacy clients (e.g., legacy client 460) that may not yet be configured to utilize the new sequence numbers for requesting data from the data volume nodes (e.g., data volume node 420).

Various components of the master volume node (e.g., interface(s) 403, allocator(s) 404, sequencer 405, encryptor 406, as well as the interfaces 423 and decryptor 426 of the data volume node 420 can be implemented as software that is executed by the stored computer-executable instructions in storage 412 and 422. They may also be implemented as specialized processors and hardware, or as a combination of software and processor/hardware.

As shown, the master volume node 410 is in communication with a client (e.g., enlightened client 450) and an edge data volume node 420. While only a single edge node is shown, it will be appreciated that the computing environment 400 for implementing the disclosed embodiments can also include a plurality of edge nodes, all of which may be similar to edge data volume node 420.

The illustrated edge data volume node 420, which can also be referred to as simply a data volume node or an edge node, includes interfaces 423 for interfacing with the master node and the enlightened client 450. The interface(s) 423 are also configured to receive and process data access requests (e.g., read/write requests) from the client system 450 and other client systems, including legacy client system 460.

The edge node 420 also includes one or more processor(s) 421 and storage 422 having stored computer-executable instructions which are operable, when executed by the processor(s) 421, to implement the disclosed functionality of the edge volume node 420.

The data volume node 420 also includes one or more data volume 427 that each store one or more storage clusters (including storage cluster 490). The storage clusters are associated with a corresponding cluster VDL indicator(s) 470 (such as VDL indicator 472 that is associated with storage cluster 490). The storage clusters are also associated with cluster sequence data 480 (such as sequence number 482 that is associated with storage cluster 490).

In some instances, the cluster VDL indicator(s) 470 and cluster sequence data 480 are stored separately from the storage clusters of the data volume 427 in storage 422. In other embodiments, the cluster VDL indicator(s) 470 and cluster sequence data 480 are stored with the data clusters they belong to (e.g., within the data clusters themselves and/or within one or more index for the storage clusters and data volume and that is maintained within storage of the data volume 427).

The decryptor 426 is configured to decrypt encrypted sequence numbers that are received in client data access requests and which may be encrypted by the encryptor 416. The decryption keys and/or authentication information used by the decryptor 426 are stored in storage 422.

The enlightened client 450, which may also be referred to herein as simply a client computing system, client system, or client, also includes one or more processor(s) 421 and storage 422 having stored computer-executable instructions which are operable, when executed by the processor(s) 421, to implement the disclosed functionality of the client system 450.

Other aspects of FIGS. 4A-4C will now be described with reference to FIGS. 5-7, which illustrate flowcharts of an example methods for managing distributed storage systems, such as those shown and described in FIGS. 1, 2 and 4A-4C.

Figure 5:
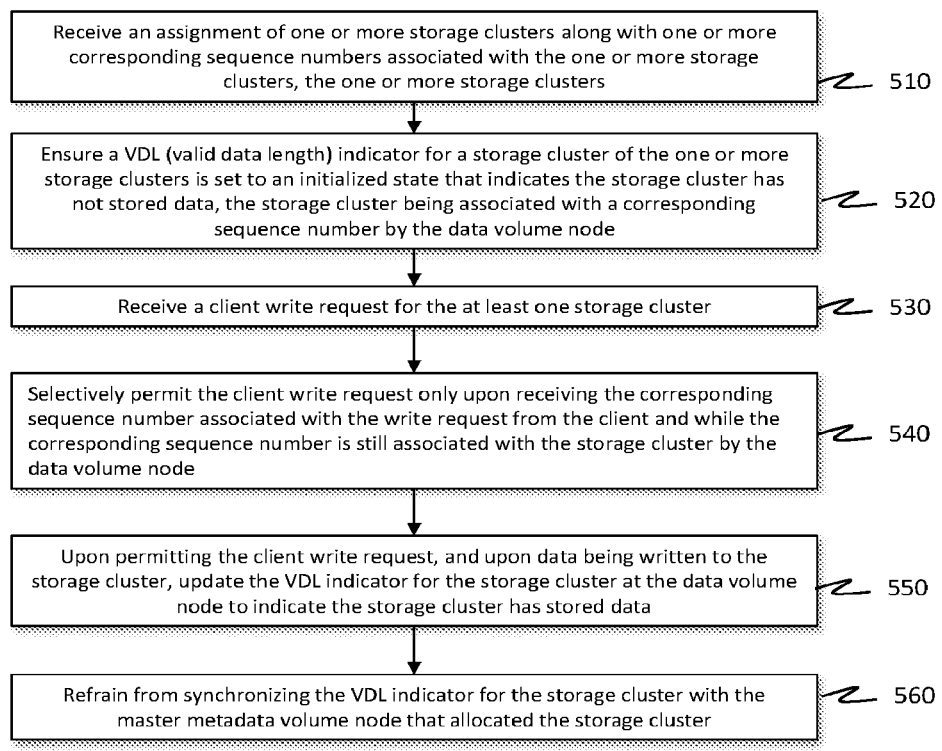
FIG. 5 illustrates a flowchart of an example method for managing a distributed storage system, such as shown in FIGS. 4A-4C, from the perspective of the data volume node.
Figure 6:
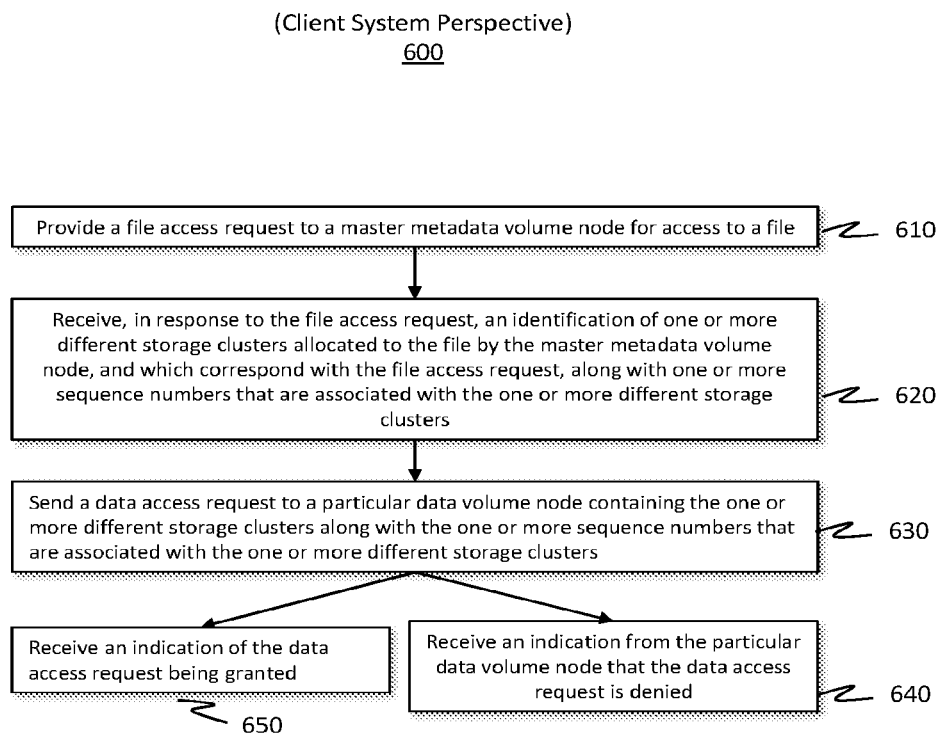
FIG. 6 illustrates a flowchart of an example method for managing a distributed storage system, such as shown in FIGS. 4A-4C, from the perspective of the client system.
Figure 7:
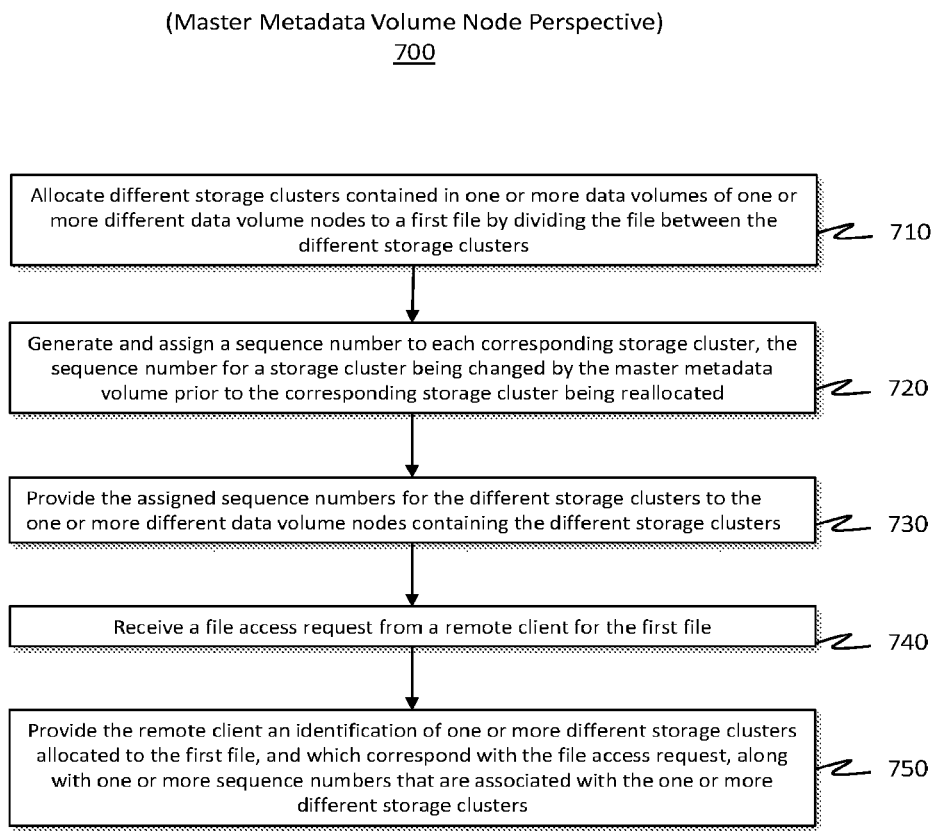
FIG. 7 illustrates a flowchart of an example method for managing a distributed storage system, such as shown in FIGS. 4A-4C, from the perspective of the master metadata volume node.

It is noted that the acts illustrated in the flowchart 500 of FIG. 5 are recited from the perspective of the data volume node 420, while the acts illustrated in the flowchart 600 of FIG. 6 are recited from the perspective of the client system 450, and the acts illustrated in the flowchart 700 of FIG. 7 are recited from the perspective of the master volume node 410.

It is also noted that although the method acts disclosed in reference to FIGS. 5-7 may be discussed in a certain order or illustrated in a flowchart as occurring in a particular order, no particular ordering is required unless specifically stated, or required because an act is dependent on another act being completed prior to the act being performed.

As shown in FIG. 5, some embodiments include methods (as well as corresponding systems and computer program products) for implementing the management of distributed storage systems based on processes performed at data volume nodes of the distributed storage system, such as data volume node 420.

For instance, these embodiments include a data volume node 420 having a data volume with storage clusters that are remotely managed by a master metadata node 410 that allocates one or more of the storage clusters (e.g., 490) of the data volume node 427 to one or more files. The data volume node 420 is also configured with at least one processor 421 and stored executable instructions (e.g., storage 422) that are executable by the at least one processor to cause the data volume node 420 to execute a data volume node method (e.g., method of flowchart 500) for implementing data access controls on a per cluster basis for the storage cluster(s).

The data volume node method includes an act of the data volume node receiving, from the master metadata volume node, an assignment of one or more storage clusters along with one or more corresponding sequence numbers associated with the one or more storage clusters, and which are contained within the data volume of the data volume node (act 510). This act is illustrated, for example, by the assignment 464 being transmitted from master node 410 to edge node 420. This assignment includes a sequence number 482 that is associated with the corresponding data cluster (e.g., cluster 490). With regard to the storage clusters associated with the sequence numbers, it will be appreciated that the storage clusters and sequence numbers may be allocated to a file or particular data structure format, for example. Alternatively, the storage clusters and corresponding sequence numbers may be completely agnostic to any particular file and/or other data structure format.

The data volume node method also includes an act of the data volume node locally associating the corresponding sequence number with by the data volume node and locally setting a VDL (valid data length) indicator for a storage cluster of the one or more storage clusters to an initialized state that indicates the storage cluster does not have stored data written by the file for which the storage cluster is allocated (even if it does have data from a previously allocated file) (act 520).

This method also includes an act of the data volume node receiving a client write request for the at least one storage cluster (act 530). This is illustrated in FIG. 4B as the data access request 466 and may include a read or write request addressed to a particular set of one or more storage cluster(s), like cluster 490. The data access request 466 will also include a sequence number associated with the storage cluster (e.g., sequence number 482). This sequence number may be encrypted, either alone or with a combination of other sequence numbers corresponding to other storage clusters that are identified in a data access request 466 provided as a response/file handle 462 by the master node 410 to a client system 450 in response to a client file access request 460.

In some instances, the client system is incapable of decrypting the encrypted sequence number, which the edge node 420 is capable of decrypting.

Notably, the client data access request 466 is permitted by the edge node 420, in response to, and only upon the data volume node receiving the corresponding sequence number (e.g., 482) from the client in the write request, or in a subsequent client request, and while the corresponding sequence number is still associated with the storage cluster by the data volume node (act 540).

The edge node 420 determines that the sequence number is still associated with the storage cluster by the edge node 420, by at least decrypting the sequence number (if encrypted) and comparing the sequence number received from the client to the stored sequence number 482 received from the master node 410, which is stored in the edge node's cluster sequence data 480. If they match, then the sequence number is determined to still be associated with the corresponding storage cluster, if they do not match, then the association that would be required to provide file access is determined to not exist and the request is denied.

When granting/permitting the data access request, the edge node 420 may provide the client system 450 with a reply 468 that includes requested data from the storage cluster(s) and/or provide an indication that the request was completed (e.g., acknowledgement of a write. This may also include acknowledgement of a deletion of data if the access request included a delete request.

When the request is a write request, and upon permitting the client write request, which causes requested data to be written to the storage cluster, the data volume node updates the VDL indicator for the storage cluster (stored with the other cluster VDL indicator(s) 470) at the data volume node to indicate the corresponding storage cluster contains data for the file that the storage cluster is allocated to (act 550). In some instances, this resenting of the VDL indicator occurs without initializing the storage cluster, such that the storage cluster maintains stale data from a previous file allocation.

In some instances, the updating of the VDL indicator is performed solely at the edge data volume node and without synchronizing or requiring any corresponding synchronization of the VDL indicator for the storage cluster at the master volume node 410, particularly when the master node 410 does not store any VDL indicator data for the storage cluster.

As shown in FIG. 6, some embodiments also include methods (as well as corresponding systems and computer program products) for implementing the management of distributed storage systems based on processes performed at the client computing systems (such as client 450). For instance, these embodiments include a client system configured with at least one processor 451 and stored computer-executable instructions (e.g., storage 452) that are executable by the at least one processor 451 to cause the client system 450 to execute a client system method (e.g., the method of flowchart 600) in which the client system 450 provides a file access request 460 to a master metadata volume node 410 for access to a file for which the master volume node 410 allocates and manages storage clusters (e.g., cluster 490) for the file.

This method includes the client system receiving an identification of one or more different storage clusters (e.g., cluster 490) allocated to the file by the master volume node 410, which is provided by the master volume node 410 in response to the file access request 460, (act 620), and which corresponds with the file access request 460, along with one or more sequence numbers (e.g., 482) associated with the one or more different storage clusters (e.g., 490).

The one or more sequence numbers may be encrypted individually or collectively into a single response/file handle 462 that also include the address information for the different storage clusters associated with the file access request 460.

The client system method also includes the client system 450 sending a data access request 466, comprising a read or write request, to a particular data volume node 420 containing the one or more different storage clusters (e.g., cluster 490) along with the one or more sequence numbers (e.g., 482) associated with the one or more different storage clusters (act 630).

Thereafter, in response to the data access request, the client system receives either an indication of the data access request is granted (act 650) or denied (act 660) by the particular data volume node as part of a grant/deny response 468.

In some embodiments, the data access request is granted in response to the one or more sequence numbers being associated with the one or more different storage clusters at the data volume node and in response to a VDL indicator (e.g., indicator 472) indicating data has been written to the one or more storage clusters (e.g., cluster 490) for the file. As discussed above, in some instances, this VDL indicator 470 is stored solely at the particular data volume node 420 and/or without being stored by or synchronized with the master metadata volume node 410.

The data access request is denied when the one or more different sequence numbers (e.g., 482) provided by the client system fail to be associated with the one or more different storage clusters (e.g., cluster 490) at the particular data volume node 420 at the time of the request (act 640). Additionally, if the request is a read request, it may also be denied when the VDL indictor indicates that data has not written to the one or more storage clusters for the file. If the request is a write request, it may still be permitted even if the VDL indicator indicates that data has not written to the one or more storage clusters for the file.

With regard to a denied request, it will be noted that this may occur as a result of another client system (e.g., 406) interfacing with the edge node 420 with the correct sequence number in a request to modify the file (e.g., move/delete a portion of the file) and which is sufficient (in some instances) to cause a resequencing of the allocated storage cluster. This resequencing, which can also be triggered by the deletion of a portion of a file can trigger the reallocation of the corresponding storage cluster storing that portion of data.

The reallocation and resynchronizing of the storage cluster is synchronized with the master volume node 410. When a resequencing event occurs, the master node 410 is notified and the master node 410 resequences the storage cluster (e.g., 490) with a new sequence number (e.g., 482-2) that is associated with the storage cluster. The new sequence number is also referred to herein as an updated sequence number. This new/updated sequence number (482-2) for the storage cluster is then sent to the corresponding data volume node 420 within a new cluster assignment 464-2 and which is then stored in the cluster sequence data 480 as being associated with the corresponding storage cluster. The receipt of this new sequence number causes the edge node to reset/initialize the VDL indicator to an initialization state to indicate that no data has yet been written to the associated storage cluster by the file that is currently allocated to the storage cluster.

Then, the client system 450, upon getting a denial (e.g., 468), and which may simply be an indication by the data volume node 420 to obtain a new sequence number for the storage cluster, can cause the client system 450 send a new file access request 460-2 to the master volume node 410 to get a corresponding new response/file handle 462-2 with the new sequence number 482-2. Then, the client 450 can send a new data access request 466-2 with the new sequence number 482-2 to the edge node 420.

The edge node 420, upon verifying the association of the new sequence number 482-2 with the stored cluster sequence data 480, can then issue a new grant/deny response 468-2 to the client, which acknowledges the requested data access has been permitted or has occurred. This may include providing the client with the data stored in the reallocated storage cluster (490) if the VDL indicator 472-2, which is initially reset by the edge node 420 to the initialization state when the new sequence number is received by the edge node 420, has subsequently been changed to indicate that data has been stored in the storage cluster by the current file for which the storage cluster is allocated.

As shown in FIG. 7, some embodiments also include methods (as well as corresponding systems and computer program products) for implementing the management of distributed storage systems based on processes performed at the master volume node 410. For instance, these methods include the master volume node 410 allocating different storage clusters contained in one or more data volumes of one or more different data volume nodes to a first file by dividing the file between the different storage clusters, as well as, generating and assigning a sequence number to each corresponding storage cluster (act 710). In some instances, a different sequence number is assigned to each correspondingly different storage cluster. In other instances, a single sequence number is assigned to a group of storage clusters and, in some instances, a single sequence number is assigned to all storage clusters belonging to a single file or other data structure.

This method also includes the master volume node 410 generating (act 520) and providing (act 530) the assigned sequence numbers for the different storage clusters to the one or more different data volume nodes containing the different storage clusters, respectively, as discussed above.

Notably, the sequence number for any particular storage cluster will be changed by the master metadata volume prior to the corresponding storage cluster being reallocated to a different file. In this manner, the master volume node 410 coordinates and synchronizes the sequence numbers for the storage clusters, even though it doesn't do this for the VDL indicators.

This method also includes the master metadata volume node receiving a file access request from a remote client for the first file (act 540) and, responsively, providing the remote client an identification of one or more different storage clusters allocated to the first file. As previously described above the identified storage clusters, which correspond with the file access request, are provided with the cluster storage address information and the one or more sequence numbers that are associated with the one or more different storage clusters (act 550).

With regard to the foregoing, it will be appreciated that the disclosed the methods may be practiced by a computer system including one or more processors and computer-readable media such as computer memory, as such as described with reference to the master metadata node, the data volume nodes and the client computing systems. The computer memory and other storage devices of the disclosed computing systems may store computer-executable instructions that when executed by one or more processors of the computing systems cause various functions to be performed, such as the acts and other functionality recited in the disclosed embodiments.

Accordingly, it will be appreciated that embodiments of the disclosed invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or transmit desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving, by a data volume node and from a master metadata volume node, an assignment of one or more storage clusters along with one or more corresponding sequence numbers associated with the one or more storage clusters, the one or more storage clusters being contained within a data volume of the data volume node;
    setting, by the data volume node, a VDL (valid data length) indicator for a storage cluster of the one or more storage clusters to an initialized state that indicates the storage cluster does not have valid stored data, the storage cluster being associated with a corresponding sequence number by the data volume node;
    receiving, by the data volume node, a client write request for the at least one storage cluster, the client write request including a first sequence number;
    permitting, by the data volume node, the client write request only when the first sequence number matches the corresponding sequence number associated with the storage cluster by the data volume node; and
    upon permitting the client write request, and upon data being written to the storage cluster, updating the VDL indicator for the storage cluster at the data volume node to indicate the storage cluster has stored data.

2. The method claim 1, further comprising:
    obtaining a new assignment of the storage cluster from the master metadata volume node, the new assignment including a new sequence number that is associated with the storage cluster by the master metadata volume node, the new assignment causing the data volume node to associate the new sequence number to the storage cluster; and
    ensuring the VDL indicator for the storage cluster is reset to the initialized state, in response to receiving the updated assignment of the storage cluster, to indicate the storage cluster does not have any valid data stored, irrespective of whether the storage cluster actually does have data stored thereon.

3. The method of claim 2, further comprising:
receiving a different client request for access to the storage cluster; and
denying the different client request based on the different client request not being associated with any sequence number that is currently associated with the storage cluster.

4. The method of claim 3, wherein the corresponding sequence number and the new sequence number are received from the master metadata volume node as encrypted sequence numbers, the method further comprising:
decrypting the encrypted sequence numbers with authentication information received separately from the metadata volume node.

5. The method of claim 3, wherein the received assignment of the storage cluster also identifies one or more other sequence numbers for one or more corresponding storage clusters contained within the data volume of the data volume node.

6. The method of claim 5, wherein every sequence number included in the assignment is encrypted with a hash signed by an encryption key for which the data volume node has a corresponding decryption key.

7. The method of claim 1, further comprising:
receiving a client read request for the storage cluster; and
permitting the client read request only when the VDL indicator has been updated so that it is no longer in the initialized state and such that the VDL indicator thereby indicates the storage cluster has had valid stored data and without synchronizing the VDL indicator with the metadata volume node that allocated the storage cluster of the data volume node to the currently associated sequence number.

8. The method of claim 1, wherein the VDL indicator is a per-cluster indicator consisting of a single bit.

9. The method of claim 1, wherein the VDL indicator is a sub-cluster multi-bit watermark indicator that indicates a watermark extent of which the storage cluster has been written to.

10. A method, comprising:
providing, by a client computing system, a file access request to a master metadata volume node for access to a file;
receiving, by the client computing system and in response to the file access request, an identification of one or more different storage clusters allocated to the file by the master metadata volume node, and which correspond with the file access request, along with one or more sequence numbers that are associated with the one or more different storage clusters, each of the one or more different storage clusters being associated with a corresponding sequence number;
sending, by the client computing system, a data access request to a particular data volume node containing at least a first storage cluster of the one or more different storage clusters along with the corresponding associated sequence number(s); and
either, (1) receiving, by the client computing system, an indication of the data access request being granted by the particular data volume node, or
(2) receiving, by the client computing system, an indication from the particular data volume node that the data access request is denied in response to at least a first of the corresponding sequence number(s) failing to be associated with a corresponding one of the at least the first storage cluster and/or in response to a VDL (valid data length) indictor indicating data has not yet been written to the one or more storage clusters by the file.

11. The method recited in claim 10, further comprising:
obtaining updated sequence number(s) from the master metadata node in response to receiving the indication from the particular data volume node that the file access request is denied; and
providing the updated sequence number(s) to the data volume node with a new file access request and which causes the new file access request to be granted.

12. The method recited in claim 10, wherein the one or more sequence numbers are received from the master metadata volume node and provided to the data volume node by the client computing system in an encrypted form that the client computing system is unable to decrypt, but which the data volume node is able to decrypt.

13. The method recited in claim 10, wherein the data access request is a read request.

14. The method recited in claim 10, wherein the data access request is a write request which causes a write to only a selected portion of the storage cluster.

15. A method, comprising:
allocating, by a master metadata volume node, different storage clusters contained in one or more data volumes of one or more different data volume nodes to a first file by dividing the first file between the different storage clusters;
generating and assigning, by the master metadata volume node, a sequence number to each corresponding storage cluster, each different storage cluster being associated with a different corresponding sequence number, the sequence number for a storage cluster being changed by the master metadata volume node prior to the corresponding storage cluster being reallocated;
providing, by the master metadata volume node, the assigned sequence numbers for the different storage clusters to the one or more different data volume nodes containing the different storage clusters, respectively;
receiving, by the master metadata volume node, a file access request from a client for the first file; and
providing, by the master metadata volume node, the client an identification of one or more different storage clusters allocated to the first file, and which correspond with the file access request, along with one or more sequence numbers that are associated with the one or more different storage clusters.

16. The method recited in claim 15, further comprising:
refraining from locally storing, at the master metadata volume node, a VDL (valid data length) indicator for the one or more different storage clusters allocated to the first file, the VDL indicator being stored locally at the one or more different data volume nodes to indicate whether the one or more different storage clusters have stored data.

17. The method recited in claim 15, further comprising:
encrypting, by the master metadata volume node, the one or more sequence numbers that are associated with the one or more different storage clusters prior to providing the sequence numbers to the client.

18. The method recited in claim 17, further comprising:
sending, by the master metadata volume node, authentication information to the one or more data volume nodes for decrypting the encrypted one or more sequence numbers.

19. The method of claim 15, further comprising:
reallocating a particular storage cluster contained in a particular data volume at a particular data volume node, which was included in the one of the one or different storage clusters, to a new file;

re-sequencing the particular storage cluster by at least generating an updated sequence number for the particular storage cluster and associating the updated sequence number with the particular storage cluster; and sending a new assignment of the particular storage cluster and the updated sequence number associated with the particular storage cluster to the particular data volume node.

20. The method of claim 19, wherein the new assignment comprises an instruction for the particular data volume to reset a VDL associated with the particular storage cluster at the particular data volume node prior to and/or without the particular storage cluster being initialized.

\* \* \* \* \*